(12) United States Patent
Lin et al.

(10) Patent No.: US 8,724,953 B2
(45) Date of Patent: May 13, 2014

(54) OPTICAL FIBER

(75) Inventors: Hsien-Chu Lin, New Taipei (TW);
Li-Shing Hou, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 100 days.

(21) Appl. No.: 13/284,955

(22) Filed: Oct. 30, 2011

(65) Prior Publication Data

US 2012/0106908 A1    May 3, 2012

(30) Foreign Application Priority Data

Nov. 2, 2010 (TW) .............................. 99137638 A

(51) Int. Cl.
*G02B 6/036* (2006.01)

(52) U.S. Cl.
USPC .......................................... 385/128

(58) Field of Classification Search
None
See application file for complete search history.

(56) References Cited

U.S. PATENT DOCUMENTS 5,982,967 A * 11/1999 Mathis et al. ................. 385/102
7,689,080 B2    3/2010 Inaba et al.

* cited by examiner

*Primary Examiner* — Jerry Rahll
(74) *Attorney, Agent, or Firm* — Wei Te Chung; Ming Chieh Chang

(57) ABSTRACT

A optical fiber (1) includes a fiber core (11); a cladding layer (12) enclosing the fiber core; a first buffering layer (13) attached to the cladding layer; a colored layer (15) coating on the first buffering layer; a second buffering layer (15) enclosing the colored layer; and wherein the second buffering layer is transparent and the colored layer can be observed from an outside.

18 Claims, 2 Drawing Sheets

OPTICAL FIBER

FIELD OF THE INVENTION

The present invention generally relates to an optical fiber, and more particularly to an improved optical fiber which facilitates indentifying and proceeding.

DESCRIPTION OF PRIOR ART

Optical signal transmitting is widely adopted for internet or intranet communication. An optical fiber is an important physical link for connecting two devices so as to establish the optical signal transmitting path therebetween. Commonly, a group of fibers are together to form a multi-lane transmitting path.

U.S. Pat. No. 7,689,080 issued on Mar. 30, 2010 to Inaba et al. discloses an optical fiber ribbon which includes a plurality of optical fibers, each includes a glass optical fiber coated with a fiber coating, that are arranged in parallel, and a ribbon coating that coats the optical fibers arranged in parallel. However, as the optical fibers commonly have single appearance or color, and it may has some problem to indentify them from each other when assembling them to corresponding lenses, fiber channels of optical termination, etc.

Hence, an improved optical fiber is highly desired to overcome the aforementioned problems.

SUMMARY OF THE INVENTION

Accordingly, an object of the present invention is to provide an optical fiber easily being identified from each other.

In order to achieve the object set forth, an optical fiber in accordance with the present invention comprises a fiber core; a cladding layer enclosing the fiber core; a first buffering layer attached to the cladding layer; a colored layer coating on the first buffering layer; a second buffering layer enclosing the colored layer; and wherein the second buffering layer is transparent and the colored layer can be observed from an outside.

Other objects, advantages and novel features of the invention will become more apparent from the following detailed description when taken in conjunction with the accompanying drawings.

DETAILED DESCRIPTION OF PREFERRED EMBODIMENTS

Reference will now be made in detail to the preferred embodiment of the present invention.

Figure 1:
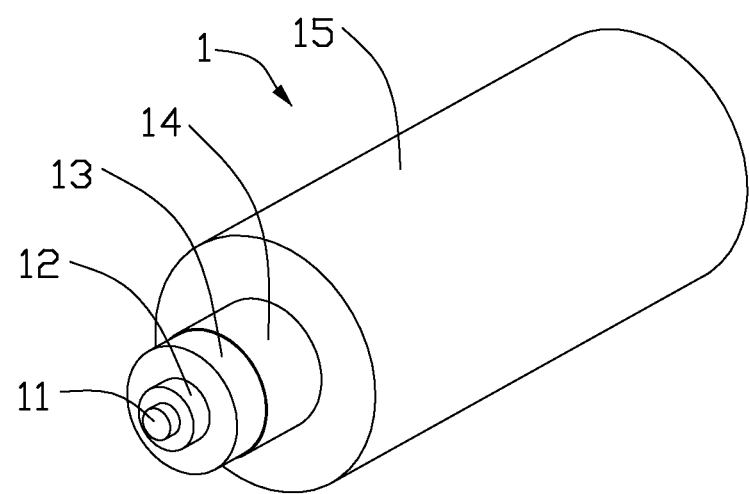
FIG. 1 is an assembled, perspective view of an optical fiber in accordance with the present invention.
Figure 2:
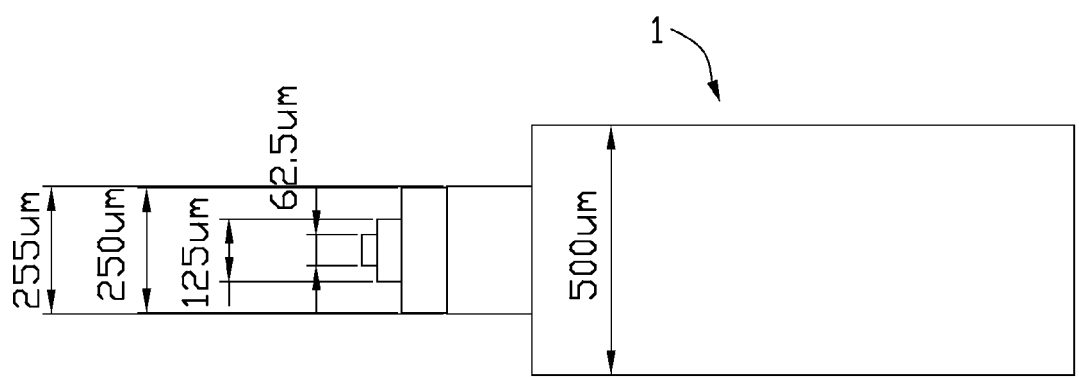
FIG. 2 is a side view of the optical fiber of FIG. 1.

Referring to FIGS. 1-2, an optical fiber 1 in accordance with the present invention is coaxially arranged multi-layers structure and from inner to outer includes a fiber core 11 made of quartz glass, a cladding layer 12 made of glass or resin and enclosing the fiber core 11, a first buffering layer 13 attached to the cladding layer 12, a colored layer 14 coating on the first buffering layer 13 and a second buffering layer 15 enclosing the colored layer 14. The first buffering layer 13 and the second buttering layer 15 are made of resin. The colored layer 14 is color ink or paint. In addition, at least the second buffering layer 15 is transparent so that the colored layer 14 can be observed from the outside.

The following is dimensions of all of the layers of the optical fiber 1 and preferred parameters or values of the different layers ensure the optical fiber 1 best transmitting property and lower proceeding cost.

The fiber core 11 is cylindrical shape with a circular cross-section and a diameter of the fiber core 11 is about 62.5 um. The cladding layer 12 has a radial thickness about half of the fiber core 11 diameter, therefore the radial thickness of the cladding layer 12 is 31.25 um. The first buffering layer 13 has a radial thickness equal to the fiber core 11 diameter, therefore the radial thickness of the first buffering layer 13 is 62.5 um. The colored layer 14 is much thinner than the fiber core 11 and has a radial thickness about 2.5 um. The second buffering layer 15 is about 122.5 um, twice thickness of the fiber core 11 and the first buffering layer 13.

The colored layer 14 is sandwiched between the first buffering layer 13 and the second buffering layer 15. Although the colored layer 14 is thin and fragile, the first buffering layer 13 and the second buffering layer 15 are hard enough to protect the colored layer 14 from being scraped off or broken down. Secondly, as the first buffering layer 13 and the second buffering 15 is transparent and the colored layer 14 can be observed from the outside, therefore it is easy to identify the optical fiber. Thirdly, as the first buffering layer 13 and the second buffering layer 15 are two distinct layers and separated from each other by the colored layer 14. Therefore, it needs not much strength to strip off a certain length of them respectively to expose the corresponding fiber core 11 outside.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An optical fiber, comprising:
   a fiber core having a radial thickness;
   a cladding layer enclosing the fiber core having a radial thickness half of the radial thickness of the fiber core;
   a first buffering layer attached to the cladding layer having a radial thickness equal to the radial thickness of the fiber core;
   a colored layer coating on the first buffering layer, the colored layer being made of color ink or paint;
   a second buffering layer enclosing the colored layer having a radial thickness twice of the radial thickness of the first buffering layer; and
   wherein the second buffering layer is at least partially transparent or translucent and the colored layer can be observed from an outside.

2. The optical fiber as recited in claim 1, wherein the fiber core is cylindrical shape and made of quartz glass.

3. The optical fiber as recited in claim 2, wherein a diameter of the fiber core is about 62.5 um.

4. The optical fiber as recited in claim 1, wherein the fiber core, the clapping layer, the first buffering layer, the colored layer, the second buffering layer are coaxially arranged from an inner to an outside.

5. The optical fiber as recited in claim 4, wherein the cladding layer has a radial thickness about 31.25 um.

6. The optical fiber as recited in claim 4, wherein the first buffering layer has a radial thickness about 62.5 um.

7. The optical fiber as recited in claim 4, wherein the second buffering layer has a radial thickness about 122.5 um.

8. The optical fiber as recited in claim 4, wherein the colored layer has a radial thickness about 2.5 um.

9. The optical fiber as recited in claim 1, wherein both the first buffering layer and the second buffering layer are made of resin.

10. An optical fiber, comprising:
a fiber core;
a cladding layer enclosing the fiber core;
a first buffering layer attached to the cladding layer;
a colored layer coating on the first buffering layer, the colored layer being made of color ink or paint;
a second buffering layer enclosing the colored layer; and
wherein the first buffering layer and the second buffering layer are at least partially transparent or translucent and separated from each other by the colored layer, under the condition that portions of the first buffering layer and the second buffering layer facilitating stripping off, respectively;
wherein the second buffering layer is about twice thickness of the first buffering layer;
wherein the fiber core is circular shape and has a diameter twice of a radial thickness of the cladding layer.

11. The optical fiber as recited in claim 10, wherein the colored layer is much thinner than the first and the second buffering layers, that the colored layer is more fragile than the first buffering layer and the second buffering layer.

12. The optical fiber as recited in claim 10, wherein the both the fiber core and the cladding layer are made of glass.

13. An optical fiber comprising:
a core, a cladding layer, an inner buffering layer, an identification layer and an outer buffering layer coaxially surrounding one another in sequence wherein at least a part of the outer buffering layer is translucent or transparent for allowing the identification layer to be visible from an exterior; wherein
said identification layer is essentially not of strength material and a thickness of said identification layer is dimensioned to be less than one tenth of those of both said inner buffering layer and said outer buffering layer.

14. The optical fiber as claimed in claim 13, wherein a thickness of said identification layer is less than 10 um.

15. The optical fiber as claimed in claim 13, wherein said thickness of the identification layer is 2.5 um.

16. The optical fiber as claimed in claim 13, wherein said identification layer is coated or printed upon the cladding layer and thinner than both the core and the cladding layer.

17. The optical fiber as claimed in claim 13, wherein said identification layer is colored.

18. The optical fiber as claimed in claim 13, wherein the inner buffering layer and the outer buffering layer are essentially axially completely separated from each other by said identification layer.

* * * * *